May 6, 1941.　　　J. T. McNANEY　　　2,240,938
RECORDING APPARATUS
Original Filed Oct. 24, 1938　　2 Sheets-Sheet 1
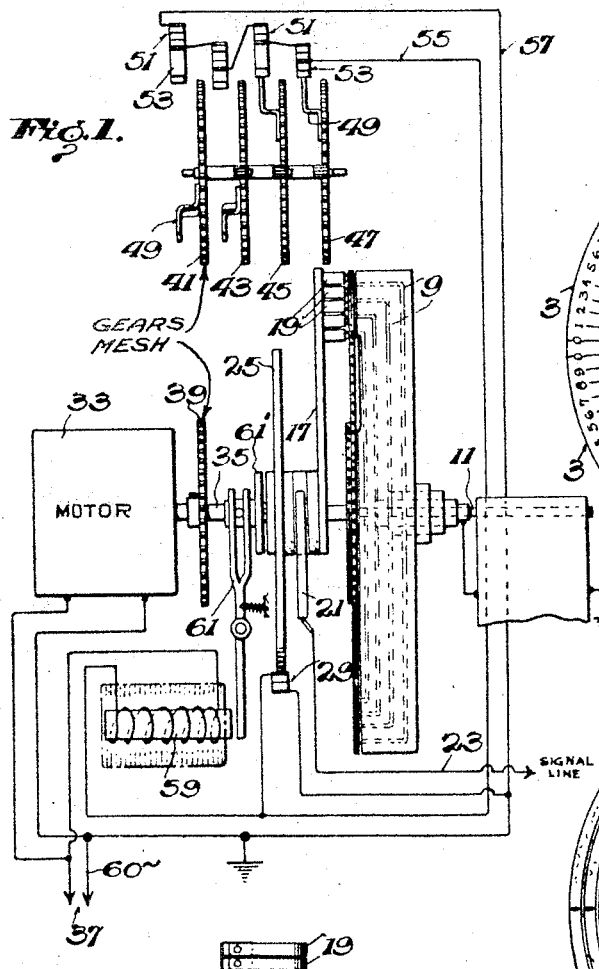
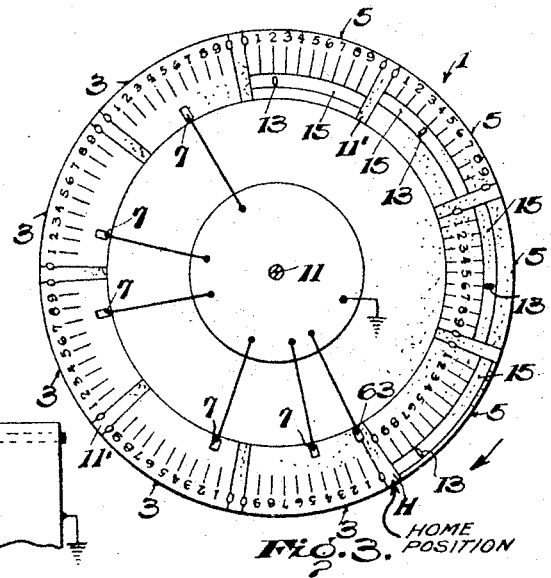
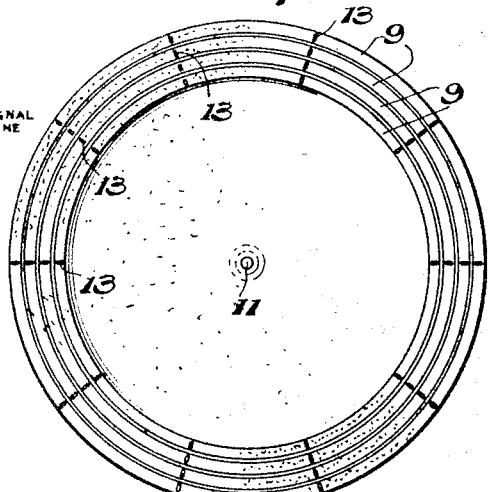
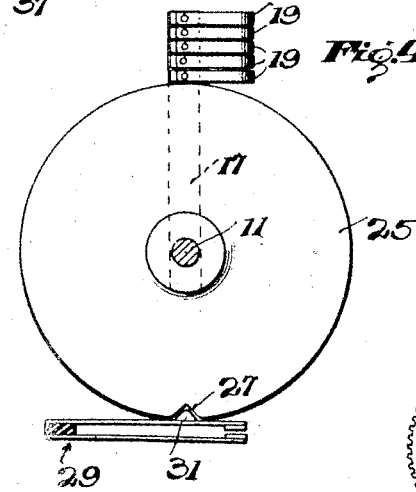
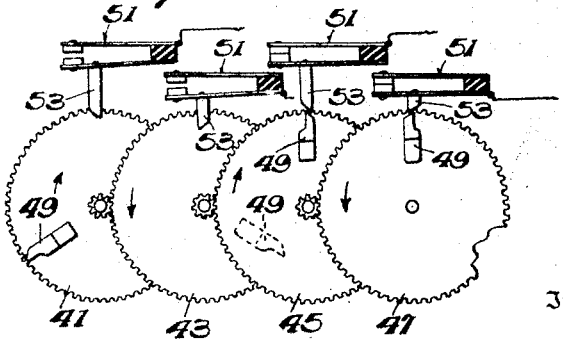
Inventor
Joseph T. McNaney

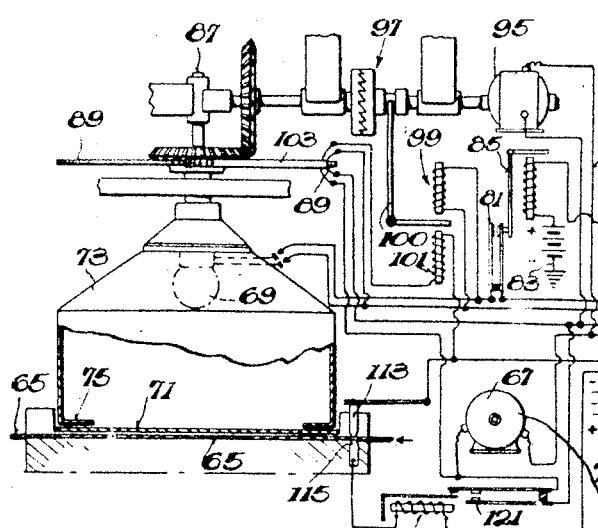

Patented May 6, 1941

2,240,938

UNITED STATES PATENT OFFICE 2,240,938

RECORDING APPARATUS

Joseph T. McNaney, Baltimore, Md.

Original application October 24, 1938, Serial No. 236,677. Divided and this application March 3, 1939, Serial No. 259,655

3 Claims. (Cl. 234—58)

My invention relates to recording systems and, more particularly, to systems whereby the indications of a plurality of meters may be sequentially recorded at a central station. This application is a division of my co-pending application, wherein the transmitting portion of my system is claimed, Serial Number 236,677, filed October 24, 1938. Although especially applicable to the recording of the indications of the meters of a number of customers served by a public service company, my invention may be utilized for recording at a central station the indications of a plurality of indicating or integrating meters of any type.

As an example of systems of the general type to which my invention pertains, I call attention to the patent to William H. Pratt, No. 1,902,465.

In the patented system, use is made of existing telephone lines for the purpose of transmitting meter indication signals to a signal station. It has been my experience that the use of telephone lines for other than telephonic purposes is not entirely satisfactory and that telephone companies are averse to such use on the ground that it interferes with proper service to their own subscribers.

It is, accordingly, an object of my invention to provide a meter indication recording system that shall require only a single metallic conductor for conveying meter indication signals from a large number of customers to a central record station.

Another object of my invention is to provide a time-controlled system of the type described that shall sequentially transmit meter indication signals from a plurality of customers to a central record station.

Another object of my invention is to provide a system of the type described that shall be completely automatic in action.

Another object of my invention is to provide, in a system of the type described, apparatus for sending meter indication signals from a plurality of subscribers' meters to a central station, which apparatus, after having initially been set into operation through the agency of but one master time-controlled means, shall so function as to positively place the said subscribers' meters sequentially in sending condition.

In accordance with my invention, I provide time-controlled transmitting apparatus at each subscriber's station and synchronously operating recording apparatus at a central station, the last mentioned apparatus being set into operation in response to an initial signal from a customer's station.

Further, I so design and proportion the various elements of each sending station that a complete record of a meter reading, including the number of the meter, may be made at the central station in less than one minute. Such being the case, it is clear that my system is capable of making 1340 consecutive records in each 24 hours or 43,200 records per month of 30 days.

Preferably, the apparatus at the central station includes means for making a permanent photographic record of the meter readings and meter numbers. Such a record is conveniently made upon a strip of photo-sensitized paper which is caused to automatically and periodically advance to the recording position after the reception of a series of signals from each customer's station.

The novel features that I consider characteristic of my invention are set forth with particularity in the appended claims. The invention in its entirety, however, both as to its organization and its method of operation, together with additional objects and advantages thereof, will best be understood from the following description of certain specific embodiments when read in connection with the accompanying drawings, wherein:

Fig. 1 is a view, partly diagrammatic and partly structural, of the circuits and signal sending apparatus I prefer to utilize at each customer's meter;

Fig. 2 is a schematic front view in elevation of a meter dial;

Fig. 3 is a view in vertical elevation, exemplifying the appearance of the front of a meter when the dial thereof is removed;

Fig. 4 is a detail view of a portion of the meter exemplified by Fig. 1;

Fig. 5 is an end view in elevation of the gear train shown in Fig. 1;

Fig. 6 is an end view in elevation of a detail of the meter, showing the construction of the electrical contact elements;

Fig. 7 is a view, partly diagrammatic and partly schematic, exemplifying the circuits and apparatus I prefer to utilize at a central record station;

Fig. 8 is a top plan view of a meter-record after developing;

Fig. 9 is a diagrammatic view of a portion of the apparatus I prefer to use in an alternative embodiment of my invention;

Fig. 10 is a schematic view of a portion of the apparatus utilized in connection with the modification exemplified by Fig. 9, and Fig. 11 is a fragmentary view of a portion of the receiving apparatus shown in Fig. 7.

In all figures of the drawings, equivalent elements are similarly designated.

Referring now to Figs. 1 and 2 of the drawings, in accordance with my invention I provide a novel meter, the said meter having a single dial 1 of insulating material, as exemplified by Fig. 2 of the drawings, the units, tens, hundreds, etc. groups 5 of the dial figures being disposed circumferentially at one side of the face of the dial and spaced apart angularly. Furthermore, the other side of the dial face is also provided with a plurality of angularly separated groups 3 of numbers and a plurality of fixed, grounded contact elements 7 are carried by the dial, one for each group, for the purpose of identifying the meter visually and for sending meter-number signals.

A group of nested cup-shaped metallic elements 9, is mounted rearwardly of the dial. The elements rotate upon a shaft 11, perpendicular to the dial, their rims lying in a plane parallel and closely adjacent to the rear face of the dial. The rim of each cup-shape element is provided with a plurality of narrow integral axially extending contact protuberances 13, as shown in Fig. 3, and the spaces on the rims between the extensions are covered with insulating material flush with the free ends thereof.

Each group 5 of dial figures, representing digits of the totalized meter reading, is accompanied by segmental window 15 individual thereto and coextensive therewith.

The windows are disposed at different radial distances from the center of the dial, thus allocating one window to each cup-shaped element through which window electrical contact may be made with the axially extending contact segments 13 carried by the cup-shaped elements. The cup-shaped elements are connected to ground through the shaft 11 and are so geared to the usual induction disk meter motor (not shown) that the contact segments on the inner element indicate tens, the next ones hundreds, the next ones thousands, and the outer ones tens of thousands.

As will be obvious to those familiar with meter construction, the nested cup-shaped elements 9 take the place of the usual meter pointers and the positions of the electrical contact elements 13, projecting forward therefrom and integral therewith, give an indication of the number of kilowatt hours consumed.

For the purpose of sending an indication of the meter reading to the central record station, I provide a wiper 17 that, when properly motivated, rotates around an axis concentric with the shaft 11 around which the dial cups revolve and sequentially engages the fixed and movable contacts. The wiper is provided with a plurality of spring contact fingers 19 of the general type shown in Fig. 6, the said contact fingers being disposed radially thereof at different distances corresponding to the radial positions of the windows 15 in the insulating dial.

The wiper is provided with a brush 21 electrically connected to a signal line 23 which extends to the central record station. In addition, the wiper-assembly includes a cam disk 25 having a single peripheral notch 27 which so cooperates with a switch 29 that, when a cam follower 31 carried by one of the switch blades as shown in Fig. 4, rests in the notch, the switch is open. This is the "rest" condition. The axis of the disk is concentric with the axis of the wiper and they rotate in unison when torque is applied.

The function of the wiper and the contact fingers is to sequentially send meter-identifying impulses over the signal line leading to the central record station, the said impulses being spaced apart in time corresponding to the angular separation of the fixed contact elements 7 carried by the meter-dial and, after the meter number impulses have been sent to send a second series of impulses, spaced apart in time, corresponding to the instantaneous angular spacing of the rotatable contact elements 13.

For the purpose of periodically causing the wiper to make one complete revolution, I provide a constantly rotating synchronous motor 33, preferably of the so called "Telechron" type, which motor has a shaft 35 concentric with the axis of the wiper shaft 11 and which is continuously energized from the same source 37 of 60 cycle current that supplies the customer.

The motor 33 turns at 1 R. P. M. and is provided with a gear 39 that meshes with the first gear 41 of a gear train, constituted by four intermeshing gears 41, 43, 45, and 47. The gears and their pinions are so designed that the first gear 41 of the train rotates at 1 R. P. M. in unison with the motor, the second gear 43 rotates at 1 R. P. H., the third gear 45 rotates once each 24 hours, and the fourth gear 47 rotates once each 30 days. Each gear has a cam or lifter 49 affixed thereto and a biased open switch 51, having a cam-follower 53 is provided for each lifter.

The lifters on the several gears and the followers actuated thereby are so designed that an angular movement of less than six degrees of each gear past the contact position of the switch associated therewith permits it to open.

As will be clear from an inspection of Fig. 1 of the drawings, the blades of the switches are so connected to a pair of conductors 55 and 57 that a circuit is complete therethrough only when all of the switches are in the closed position. The closing of all of the switches and consequent completion of the circuit takes place only once every 30 days. When the switches are all closed, the completed circuit supplies line current to a solenoid 59 that, in turn, actuates a clutch assembly 61 to effectively connect the motor 33 to the wiper and notched disk assembly, causing the wiper 17 to rotate from its rest or home position H in the direction of the arrow shown in Fig. 2.

Obviously, the switch 51 associated with the first gear 41 and actuated by the lifter 49 carried thereby, remains closed but for an instant, and the solenoid energizing circuit would be broken were means not provided for maintaining it closed during one revolution of the wiper which sends the meter reading and meter number signals into the signal line. For that reason, the notched disk 25 and the switch 29 is provided, the switch being closed by reason of the rotation of the disk immediately upon energization of the solenoid to remain closed until the notch therein has made one revolution to again come to the home position to permit the switch to open.

As stated hereinbefore, the rim of each meter-cup directed toward the insulating dial is provided with a layer of insulating material except at the points thereon at which the contacts are disposed. For that reason, the respective fingers 19 carried by the wiper 17 during its rotation around the dial connect the said cups to the signal line only at the instants when they pass over the said contacts. Having access to but one window 15 at a time, the wiper must, of necessity, send the meter number signals and the motor-reading signals in proper sequence.

For example, it may be assumed for purposes of explanation, that the service man is supplied with a meter, all of the switches of which are in the closed position, which meter is to be installed in a customer's place of business or home. It may also be assumed that it is feasible to transmit the meter reading at 6:55 p. m. on the day of installation without interfering with signals from other meters already in place in other locations.

Under the given circumstances, the service man first physically mounts the meter in position, making sure that it is not connected to the power line but is connected to the customer's circuit. Thereafter, promptly at 6:55 p. m., he connects the meter to the power lines whereby the first, or zero reading is transmitted to the central station and the "minutes" switch opens to not close again simultaneous with the other switches 51 until 6:55 p. m. thirty days after the day of installation. If there is no free time-period on the day of installation, the service man may connect the meter per se to the power lines without connecting the motor 33 thereto. In such event, the motor 33 is subsequently connected to the power lines at such time that will not permit interference with other signals and the first train of signals transmitted from the customer's meter, as described above, will not represent the zero reading but the amount of current consumed by the customer subsequently to the day of installation of the meter.

The angular displacement between the notch in the disk and the wiper must be such that the resilient fingers carried thereby, when current is first connected, are initially disposed upon the face of the insulating dial in the home position H, shown in Fig. 2. This is the condition immediately preceding the sending of a series of impulses determined as to time by the operation of the gear train.

On the day allocated to the meter, to the hour and minute, after the motor has been energized, the switches 51 will instantaneously be connected in series and an impulse will be applied to the solenoid 59 causing the clutch to function to apply torque to the wiper and disk assembly. The wiper 17 immediately moves away from the home position H in the direction of the arrow shown in Fig. 2 and, in its movement around the dial face, first engages a fixed grounded contact 63 associated with the zero position of the first group of meter number figures to send an indexing signal into the signal line. Thereafter, during the rotation of the wiper, the fingers successively engage the fixed contacts representing the meter numbers and, after impulses representing the number have been sent, engage the movable contacts representing the meter reading. The rotation of the wiper continues until it reaches its home position H and the follower 31 affixed to the upper blade of the switch 29 drops into the notch 27 provided therefor in the disk. At that instant the circuit which supplies current to the solenoid is broken and the clutch 61 is released. The wiper 17, therefore, remains in the home position H until 30 days more have elapsed whereupon the same sequence of operations is repeated.

In order that controversy between the company and the customer shall be obviated, I provide means in the central station for making a permanent photographic record not only of the meter reading but also of the number of the meter. For that purpose, referring to Fig. 7, I prefer to utilize a strip 65 of sensitized photographic paper that is moved into recording position by a motor 67 just previous to the reception of a train of signals and to utilize an intermittently energized lamp 69 for printing a representation of the meter dial upon the paper when in recording position and for causing consecutive marks to be made upon the paper, circumferentially of the dial-picture, corresponding in angular position and displacement to the totalized meter reading and to the meter number.

Referring now to Figs. 7 and 11 of the drawings, the strip 65 of photographic sensitive paper is caused to intermittently advance beneath a generally translucent mask 71 on which is imprinted a replica of the dial face at a transmitting station. The lamp is disposed above the mask, and is provided with a depending reflector housing 73 or the like carrying at its lower edge an inwardly directed rim 75. The rim, which is disposed in close proximity and parallel to the mask, projects a distance just short of the indicia on the mask and is provided with a single triangular opening 77 through which light can reach the translucent periphery of the mask and affect the photographic paper thereunder. The lamp 69 is energized from a local source 79 under the control of a normally open switch 81 disposed in the supply circuit.

In order to simplify the drawing, the paper supply and take-up rolls have not been shown and the lightproof enclosure for the entire apparatus, obviously required, has been omitted.

In the home or rest position, the opening 77 in the rim of the lamp housing overlies the zero appearing at the beginning of the first group of meter members, as shown in Fig. 8.

According to the invention, the first signal from a customer's meter, corresponding to engagement of the wiper fingers with the first contact on the meter dial immediately adjacent to the home position H of the fingers, is utilized at the record station to cause the lamp 69 to flash and to initiate rotation of the depending housing 73 and circular movement of the inwardly directed rim 75 provided with the triangular opening 77. For the purpose of causing the light to flash initially to indicate the zero or home position of the triangular opening, the incoming signal line is connected through the winding of a relay and a local source 83 of direct current to ground. The armature 85 of the relay is so disposed with respect to the switch in the lighting circuit that each time the relay is energized, the said circuit is momentarily closed to cause the light to flash.

It is also necessary that the housing be caused to rotate at substantially the same instant the first impulse is received and to continue rotating in synchronism with the wiper at the transmitter until one revolution is completed. To that end, I mount the housing upon a shaft 87 which also carries a cam disk 89, (referring to Fig. 11) which has a notch 91 in the periphery thereof and a raised portion 93 immediately adjacent to the notch and apply torque to the shaft from a constantly rotating synchronous motor 95 under the control of a movable clutch 97. The synchronous motor 95 is supplied with alternating current from the same power line 37 to which the motor 33 at the customer's meter is connected.

The position of the clutch 97 is determined by the energization of either of two solenoids 99 and 101 operatively associated with a bell crank 100 which throws the clutch into and out of engagement. The solenoid 99 which causes engagement of the clutch and which preferably exerts more pull than the solenoid 101 which causes disengagement of the clutch, is connected through the switch 81, which controls the lamp circuit, to the local source 79 of lamp-potential.

At the instant the first impulse comes from a customer's station, the lamp 69 flashes to imprint the scale on the photographic paper and to shine through the triangular opening 77 to provide a reference indication. The solenoid 99 is also momentarily energized to cause the clutch 97 to engage and to thereby set the housing into rotation. By reason of the saw tooth engaging faces of the clutch, it will remain in engagement after momentary energization of the solenoid until such time as the other solenoid pulls the bell crank into the disengaged position.

A switch having four super-imposed blades 103, 105, 107 and 109 is disposed tangentially of the disk 89 carried by the lamp housing shaft, as shown in Fig. 11, the two upper blades 103 and 105 being included in a circuit that supplies the clutch disengaging solenoid 101 with potential from the same local source that supplies the lamp. Normally, the two upper blades are biased toward the open position.

The two lower blades 107 and 109 are included in a circuit that supplies current from the same local source to the paper advancing motor 67. The said lower blades are biased toward the closed position and the uppermost one, 107, of the said two, still referring to Fig. 11, is provided with a cam follower 111 of insulating material. The cam disk 89 rotates in the direction of the arrow shown in Fig. 11, and the relative position of the four bladed switch with respect thereto, is such that when the cam follower rides upon the smooth periphery of the disk, both circuits referred to are open. When the cam follower is in the notch 91, the two lower contacts close and when the cam follower rises up on the raised portion of the disk adjacent to the notch, the two upper contacts close and the two lower contacts open.

The last mentioned position of the disk corresponds to the home position H (Fig. 2) of the wiper at the customer's meter and is the rest position thereof.

As soon as the first signal comes in from the customer's meter, the disk starts rotating in the direction of the arrow (Fig. 11) and the cam follower drops down to the smooth periphery thereof.

As heretofore explained, the clutch remains in engagement and the disk continues rotating at 1 R. P. M. until the cam follower drops into the notch. At the instant the follower reaches the bottom of the notch the two lower blades of the switch close to permit power from the alternating current lines 37 to be applied to the paper-advancing motor 67. As soon as the paper has advanced a slight amount, it separates two switch contacts 113 and 115 which, in the rest position of the system, engage through one of a plurality of small openings 117 in the paper shown clearly in Fig. 8. The disengagement of the said contacts breaks a circuit that supplies potential from the local source to the winding of a relay 119, which relay, when the winding is energized, holds open a switch 121 interposed in a shunt circuit that supplies alternating potential to the paper driving motor. The de-energizing of the relay, therefore, completes a "hold in" circuit and causes the paper driving motor to continue rotating until the next succeeding opening in the paper passes between the switch contacts to permit energization of the relay 119 and interruption of the motor supply circuit.

The disk continues rotating a slight amount after the sequence of operations just described has been initiated until the cam follower 111 rises up on the raised portion 93 thereof to cause the upper contacts of the switch to close and complete a circuit from the local source through the solenoid 101 that actuates the bell crank 100, which, in turn, disengages the clutch 97 and deprives the disk-shaft 87 of torque. The disk 89 then is in the home position and, because of the fact that a fresh unexposed section of the photographic paper has been advanced into recording position, the system is ready for the reception of a train of signals from the next successive customer's meter.

It also lies within the spirit and scope of my invention to omit the gear trains from a group of customers' meters and to utilize a single matter time-controlled gear train to initiate the sequential operation of all of the meters in the group. The master gear train may be associated with a customer's meter or it may be entirely disassociated from any meter whatsoever and disposed at some pre-determined location in the area being served or at the central office. The following description refers to a system wherein the master gear train is disposed at a customer's meter.

Referring once more to Fig. 1 and to Figs. 9 and 10 of the drawings, the alternative embodiment of my invention comprises one master time-controlled customer's station substantially the same as that exemplified by Figs. 1–5 of the drawings, with the exception that the cam disk associated with the wiper is constructed as exemplified in Fig. 9, having a peripheral notch 125 and a peripheral raised portion 127. The switch associated with the cam disk is constructed as shown in Fig. 9, comprising three super-imposed blades, 129, 131 and 133 the lowermost of which has a cam follower 135 that engages the periphery of the disk. The disks 25, shown in Fig. 9, are representative of signal sending apparatus at a plurality of customers' meters, the said apparatus being further exemplified by Fig. 10, wherein elements analogous to those described in connection with Fig. 1 are similarly designated.

Referring again to Fig. 1 of the drawings, once each month at the master station, under the control of the gear train, the clutch is actuated and an indexing signal followed by a series of meter number and meter reading signals are transmitted over the signal line 23 to the central record station. The disk continues to rotate in the direction of the arrow shown in Fig. 9 until the raised cam portion thereof causes all three of the switch contacts to close momentarily and, thereafter, by reason of the engagement of the cam follower with the notch in the disk, causes both contacts to open and breaks the motor circuit which is maintained closed through the two lower contacts (Fig. 9) while the cam follower rides upon the smooth periphery of the disk. Going back slightly in time, when the follower instantaneously rests upon the raised portion of the disk, the upper and lower contacts of the switch are closed and a circuit is completed therethrough to supply energy to the wiper-driving motor associated with the customer's meter from which the next successive reading is desired. It is, of course, to be understood that the successive customer's meters include a wiper and grounded meter dials substantially the same as those described in connection with Fig. 1, the only essential difference in the system residing in the omission of the time control and clutch actuating mechanism from all of the meters except the master meter.

The energization of the wiper motor 33 at each customer's meter is initiated by the next preceding customer's meter, as just explained, and the meters will sequentially operate to first send an indexing signal and a series of meter number and meter reading signals until the disk thereat rotates into the home position where the cam follower drops into the notch in the disk to break the local motor circuit.

It is also to be clearly understood that my invention is not limited to the specific structural arrangement of the dial cups, etc. nor to the specific configuration of the insulating dial itself.

Many other modifications of my invention will be apparent to those skilled in the art to which it pertains. My invention, therefore, is not to be restricted except insofar as is necessitated by the appended claims.

I claim as my invention:

1. In apparatus of the type described, a light source, means for intermittently energizing said source in accordance with each of a train of electrical impulses representative of the reading of a meter, means for so supporting a strip of photosensitive material that it may be exposed to light from said source, an annular light-limiting element rotatably disposed between the source and the supporting means and lying in a plane substantially parallel to the plane of the material, the said element having at least one portion through which light may reach the material from the source, a synchronous motor, and means, responsive to the first impulse of a train of electrical impulses, for causing the application of torque to the light-limiting element from the motor.

2. The invention set forth in claim 1, further characterized in that means are provided for causing the torque to be removed from the light-limiting element upon the completion of one revolution thereof.

3. The invention set forth in claim 1, further characterized in that additional light modifying means are interposed between the source and the position occupied by the photo-sensitive material whereby a plurality of circumferentially disposed groups of numerals may be imprinted upon the said material where it is not obscured by the rotatable mask.

JOSEPH T. McNANEY.